July 13, 1965  M. AUBERT ET AL  3,194,742

FUEL LOADING AND UNLOADING ARRANGEMENT FOR NUCLEAR REACTORS

Filed Aug. 2, 1963  11 Sheets-Sheet 1

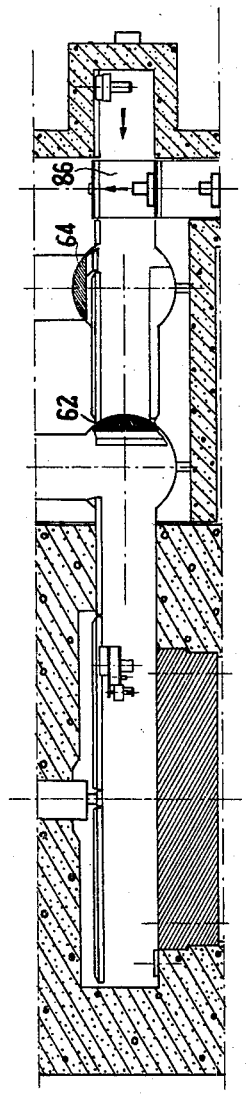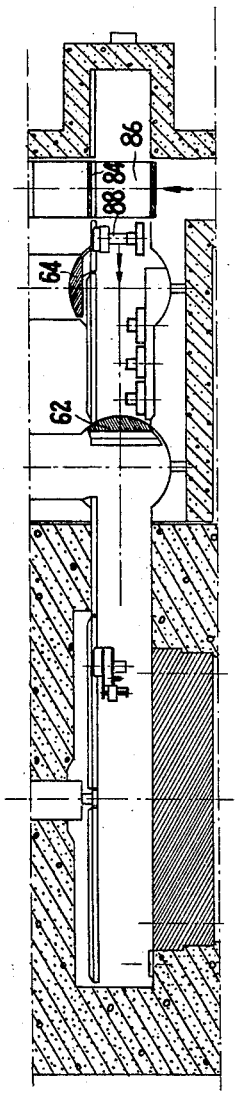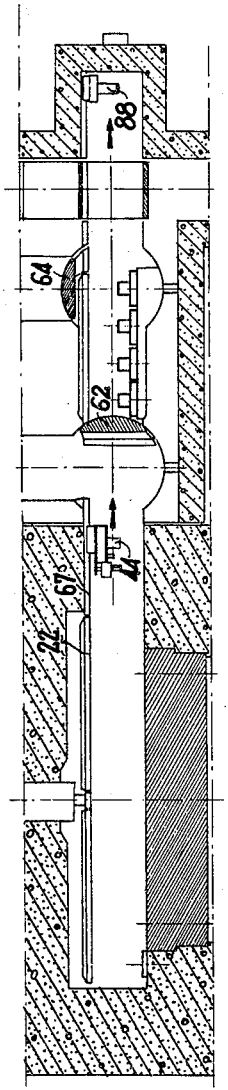

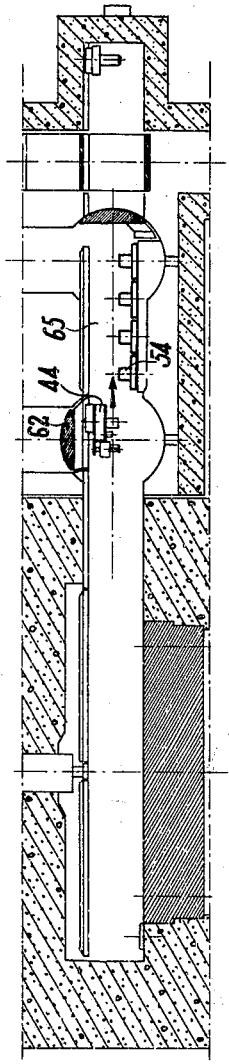
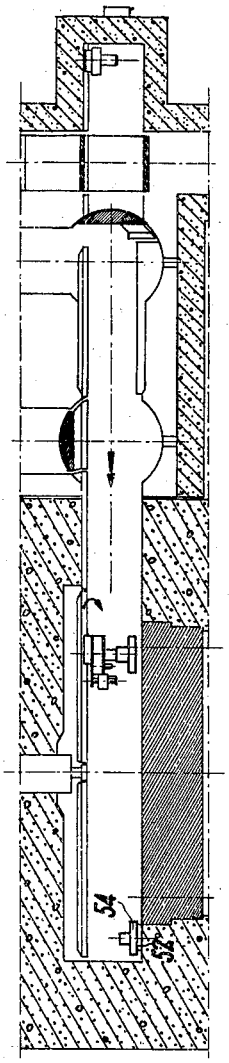
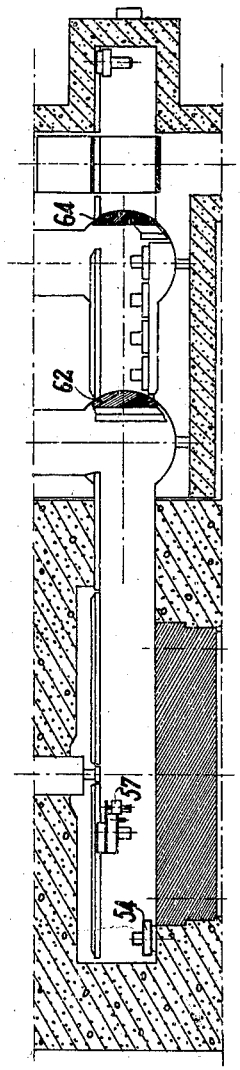

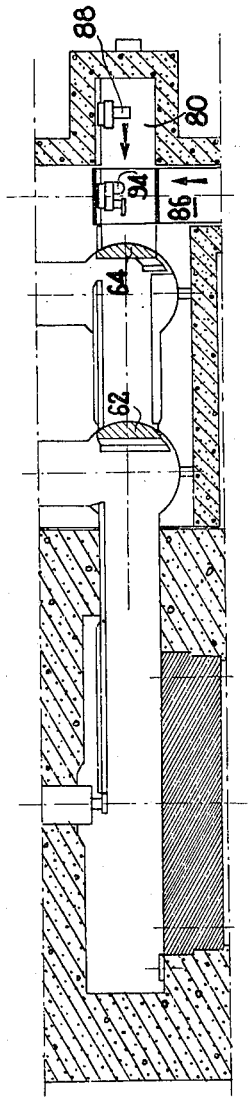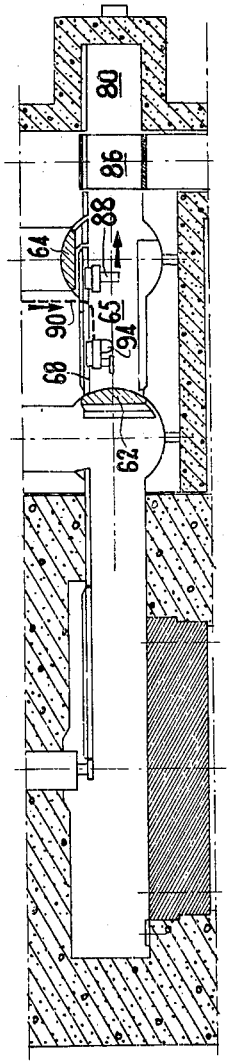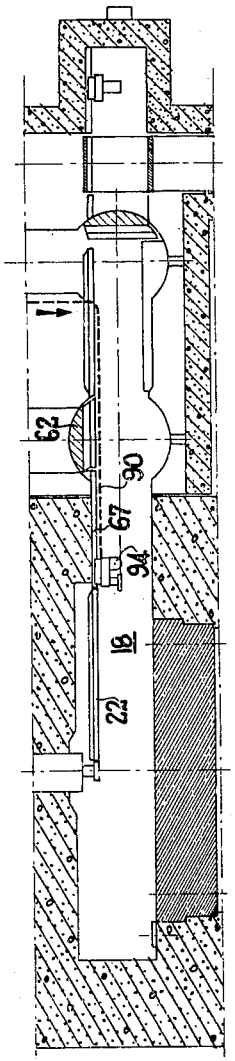

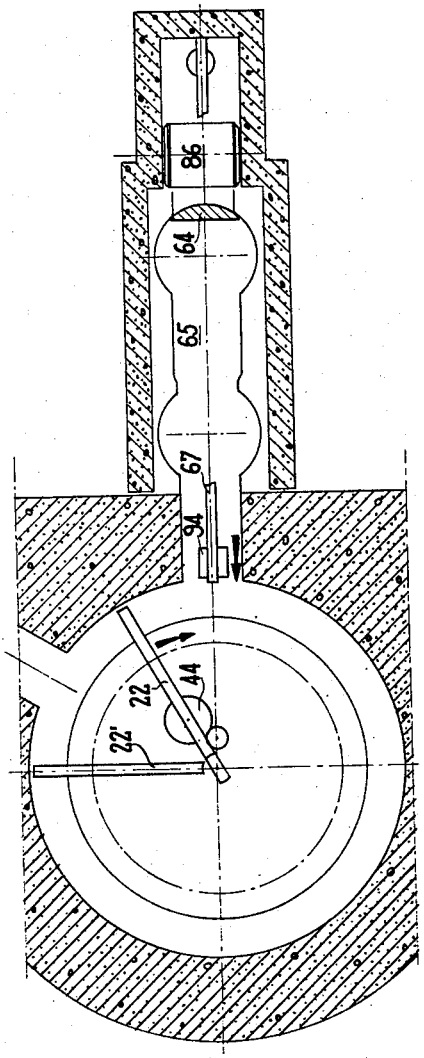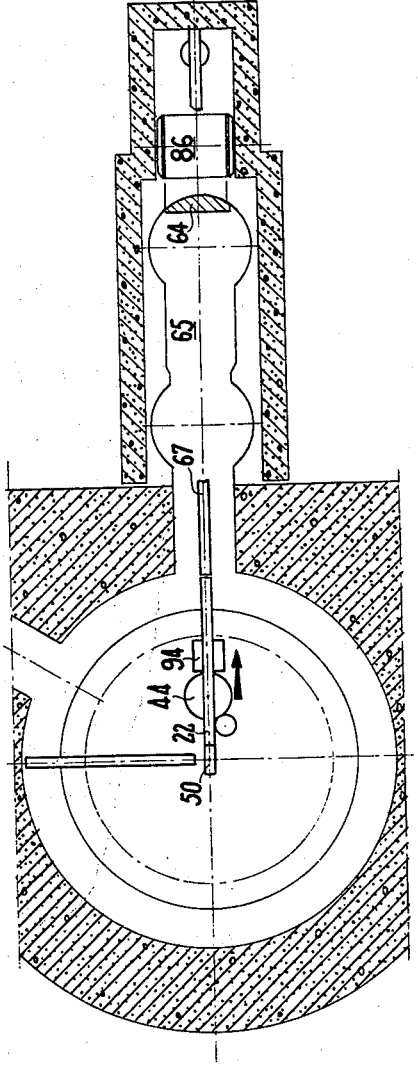

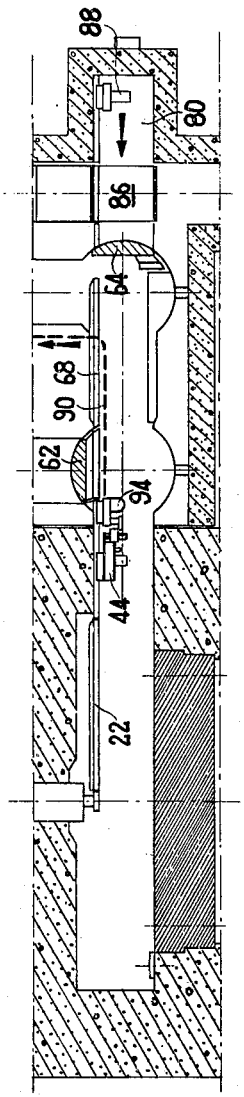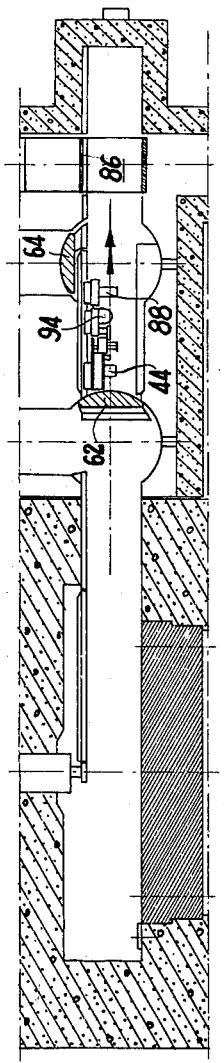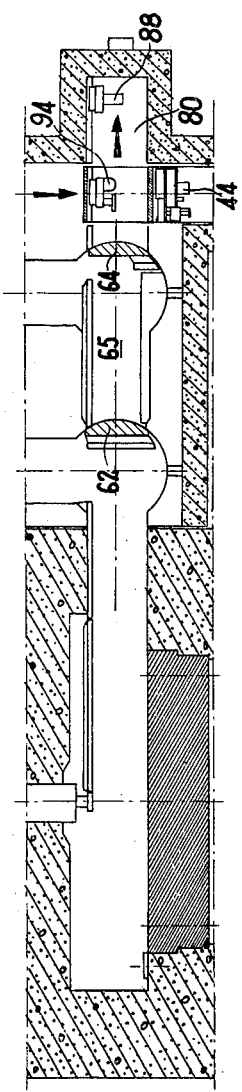

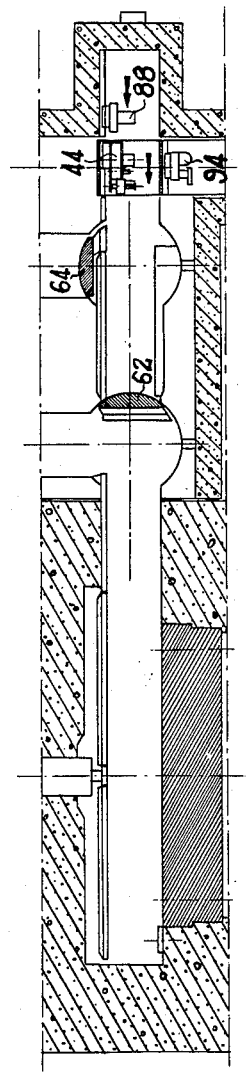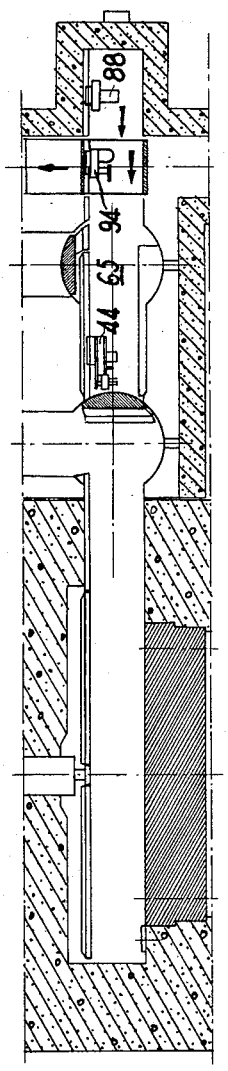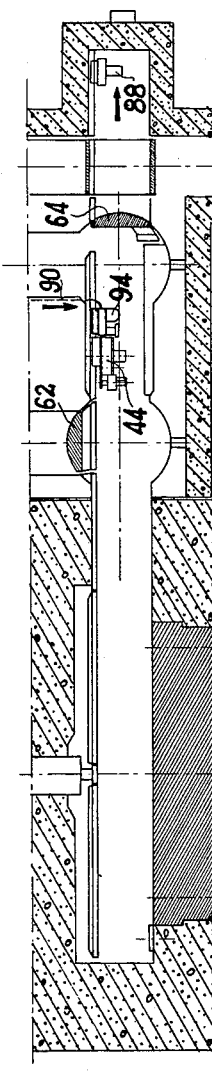

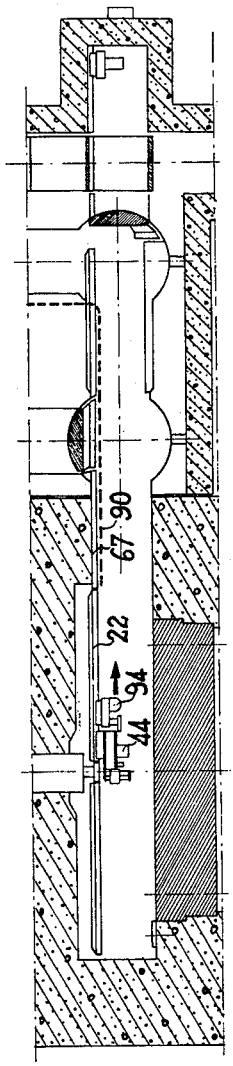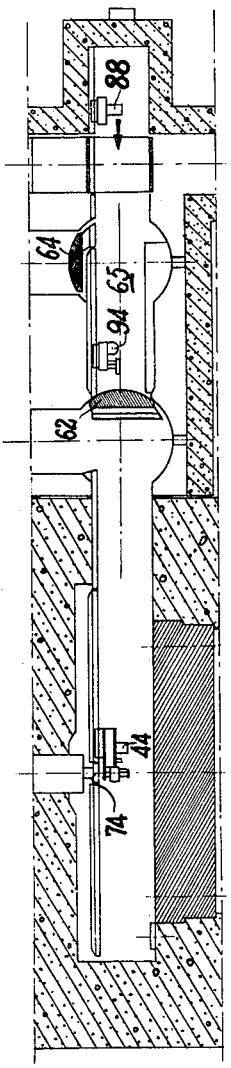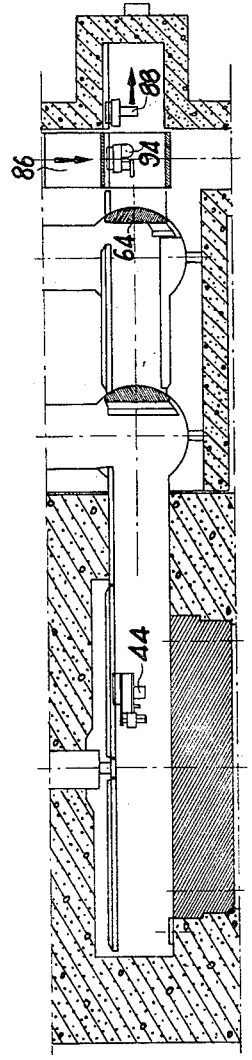

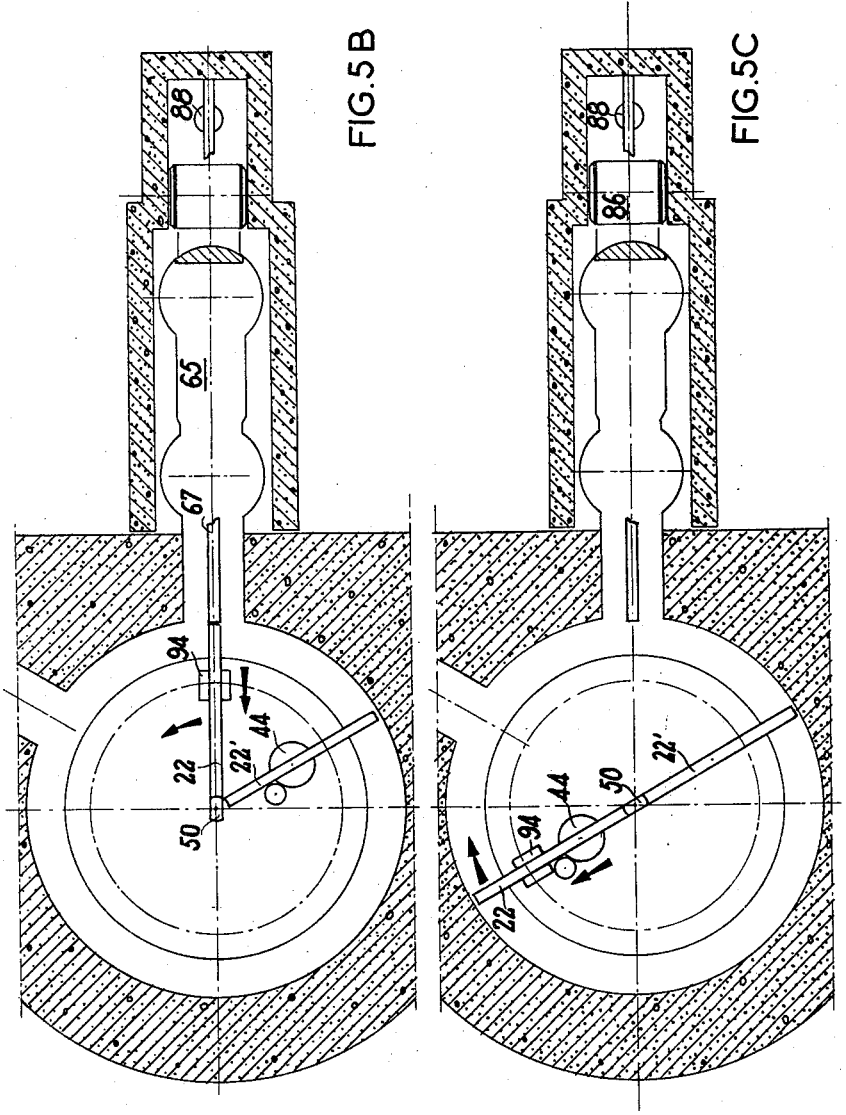

United States Patent Office 3,194,742
Patented July 13, 1965

3,194,742
FUEL LOADING AND UNLOADING ARRANGE-
MENT FOR NUCLEAR REACTORS
Michel Aubert, Fontenay aux Roses, Guillaume Fortin,
Massy, René Gugenberger, Chatillon-sous-Bagneux,
Roger Martin, Paris, and Pierre Rouge, Gif-sur-Yvette,
France, assignors to Commissariat à l'Energie Ato-
mique, Paris, France
Filed Aug. 2, 1963, Ser. No. 299,504
Claims priority, application France, Aug. 3, 1962, 906,112
7 Claims. (Cl. 176—30)

This invention relates to a fuel loading and unloading arrangement for nuclear reactors, and particularly for graphite-moderated gas-cooled nuclear reactors.

The arrangement is intended to be used in nuclear reactors having a servicing chamber within the reactor pressure vessel and biological protection shield, the chamber being separated from the reactor core by a concrete slab or the like; the servicing chamber is sometimes referred to as a "garret." The presence of the slab reduces contamination of the arrangement considerably, since the radiations from the core are weakened and decontaminated coolant only may be admitted into the chamber. There is no need for the moving parts to be heavily shielded since the device is separated from the atmosphere by the reactor biological shield.

The arrangement described in copending application of Lemesle et al., Serial No. 257,894, filed Feb. 12, 1963 comprises storage means located in the servicing chamber, means for introducing fuel magazines into the chamber and transferirng such magazines to the storage system and for removing such magazines from the storage system, the handling system having means for taking and placing the fuel elements magazines on the storage system and for exchanging fresh fuel elements in the magazines for spent elements in a fuel channel.

One of the advantages of this arrangement is that it enables spent fuel elements to remain inside the reactor vessel and biological shield long enough for them to cool down and deactivate.

The particular embodiment disclosed by the above mentioned application provides a very high reloading rate because the steps of exchanging the fuel elements between the outside of the vessel and the storage system (introducing and removal operations) and the steps of treating the channels from cans, are completely independent of one another. To achieve this independence, the introduction and removal system is embodied as a gantry which can move in the tunnel and which has a lock separating the servicing chamber from an elevator, the gantry being movable between a first position, in which the gantry picks up or deposits a cartridge can on or from the storage system, and a second position in which the gantry deposits or picks up a receptacle in the elevator, while the storage system is in the form of a number of movable elements. As will be apparent, there is no intervention of the handling system beyond the storage system, and the channels can be given substantially permanent treatment.

Disadvantages of this system, however, are the need to have a storage system comprising moving elements and, more particularly, the need to have a transfer gantry permanently supplied from the lock via flexible cables. The presence of the flexible cables makes fault-finding difficult and, more particularly, means that the reactor must be stopped if repairs are required to the cables.

It is an object of this invention to provide a simplified loading and unloading arrangement which is adapted to normal reloading rates, which retains the main advantage of the device according to the above mentioned application and which enables maintenance to proceed without interruptions of operation.

In a preferred embodiment, the handling system comprises at least two main arms, one central arm and releasable arm-aligning means adapted to align the central arm with one and/or the other of the two main arms, in order that a handling machine may move from one main arm to the other. With this latter feature, and if there are two tunnels each having a lock fitted with a chain, a failed loader can be discharged even in a lock.

A transfer machine extending between the elevator and the lock, and the chain, alternate with one another to bring a remotely controlled fault-finding handling device as far as an arm disposed opposite the tunnel. The fault-finding device is then connected up, operates in the servicing chamber and is taken in charge, possibly at the same time as the handling device, by the chain.

Other objects and advantages of the invention will appear from the following description with reference to the accompanying drawings which illustrate an embodiment of the invention by way of non-limitative example and in which.

FIGURES 3a–3f diagrammatically illustrate the sequence of loading and unloading operations;

FIGURES 4a–4n diagrammatically illustrate the sequence used in removing parts of the arrangement for repair, and FIGURES 5a–5e diagrammatically illustrate another removing sequence.

Figure 1:
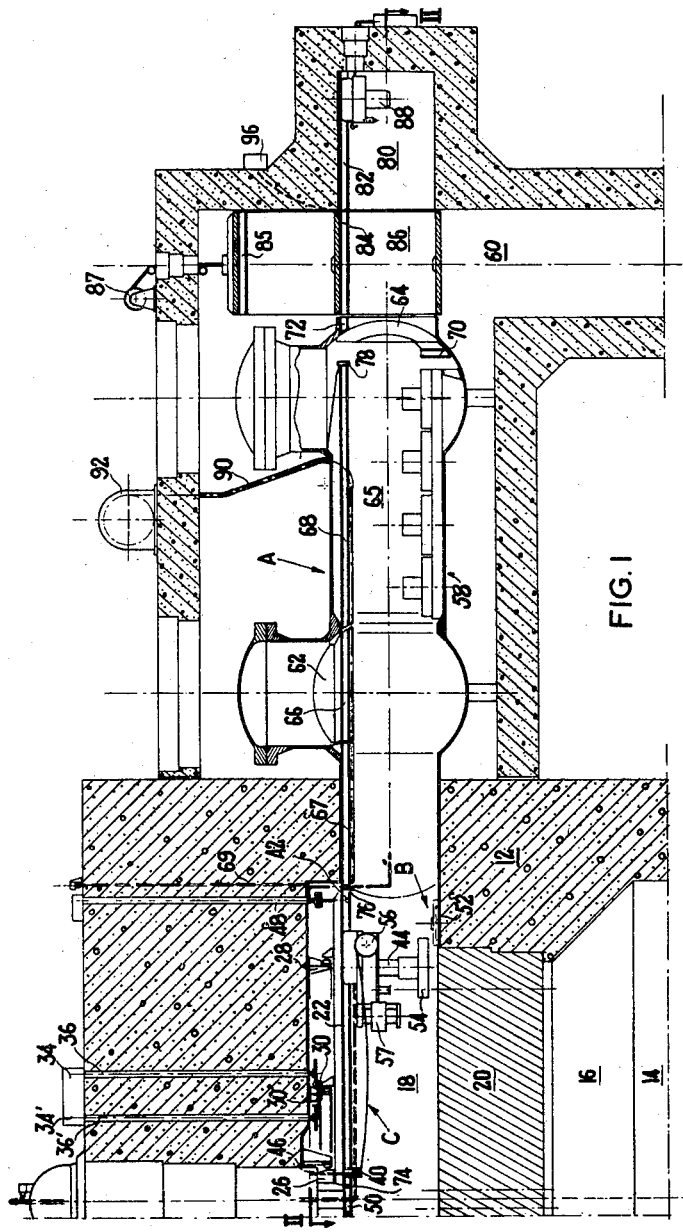
FIGURE 1 is a view of the loading and unloading arrangement in vertical section along the line I—I of FIG. 2.

The arrangement described herein is for servicing the channels of a nuclear reactor similar to the reactor described in the above mentioned application and to which reference can be made. As FIG. 1 shows, the active part of the reactor is enclosed in a caisson 12 which provides biological protection and also acts as an enclosure withstanding the pressure of the gas-coolant—as a rule, carbon dioxide—flowing through the reactor. The reactor core 14 is disposed in a bottom chamber 16 which is separated from a top chamber or "garret" 18 by a concrete slab 20. The arrangement can to some extent be subdivided into a system A for introducing fuel cartridge magazines or pots, a storage system B, and a handling system C, all of which will now be described. The system C comprises two arms 22, 22' (although this number is not limitative) mounted for rotation independently of one another around the vertical axis of the reactor. The two arms are similar to one another and only the arm 22 will be described. The same is borne by a central pivot assembly 24 to which it is connected by a support 26 and by a circular track or runway or the like 28 on which a roller borne by the arm runs. The pivot and the track 28 are common to the two arms. The arm 22 has a circular toothed rack 30 engaging with a gear 32 which is driven from outside the reactor by a motor 34 through a transmission shaft 36 which can move axially to disengage from the toothed rack 30. In order that the movements of the arm may be followed, its orientation can be reproduced on the control panel by some form of conventinal remote indicating system. The arm 22' has elements similar to those of the arm 22; they have the same reference number in the drawings plus the apostrophe.

As just described, the arm-driving means are disengageable from outside the reactor independently of one another, and so in the event of one of the arms breaking down, it can be pushed by the other arm still working. Each main arm has two electricity supply plugs 40, 42

(for the arm 22). Plug 40 is associated with a handling machine 44 borne by the arm, and plug 42 is associated with a remote controlled manipulator device 94 which will be described hereinafter. The devices 44 and 94 can be connected to the plugs from outside the reactor by means of remote control devices 46, 48 (FIG. 1) when the arms are in an appropriate position opposite the introduction and removal tunnel. The pivot 24 also bears a short central arm 50 of a length such as to allow the handling device 44 to move between the two main arms. The arm has a releasable orientating device (not shown) similar, for instance, to those of the main arms. An externally operated dog clutch (not shown) can engage or disengage the central arm 50 and either of the main arms when opposite for movement as a whole. Disposed inside the pivot of the central arm 50 is an orientable inspection periscope via which the position of the handling machine 44 and, if desired, registration between the central arm 50 and one of the main arms can be checked. The periscope can be retracted by being raised to allow a device to move along the short arm.

The storage system B is disposed at the periphery of the servicing chamber 18. In the embodiment illustrated, the storage system B is merely a number of storage sites contrived in an annular area 52 of the pressure vessel 12 around the slab 20. These storage sites receive magazines 54 filled either with fresh cartridges (in which case the magazines are introduced into the attic 18 by the system A and the handling machine 44) or with used cartridges (in which case the magazines are deposited by the handling machine). Alternatively, the storage system B can be embodied as a "train" similar to the train disclosed in U.S. Patent application Serial No. 257,894. In any case the storage sites are provided to a sufficient number for the used-cartridge magazines to stay there long enough to be deactivated.

The handling machine 44 and the magazines 54 can be similar to those described in the co-pending applications Serial No. 257,894 and Serial No. 257,893, filed February 12, 1963 by Georges Lemesle et al. In this present invention, the loader 44 is supplied and controlled via an electric cable connected to the plug 40. A conventional winding drum 56, visible in FIG. 1 and borne by the machine 44, tensions the cable continuously and prevents the same from dragging. The winding drum can be of the block-and-tackle or rubbing kind. In the embodiment illustrated in FIG. 1, the winding drum is included in the machine 44, and this arrangement means that the cables can be worked on without the reactor having to be stopped. Alternatively, the winding drum can be fitted in the sealing dome above the pivot, in which case the cables are better protected against radiation but the reactor must be stopped when it is required to work on the cables. The advantage of a supply by cable with a winding drum over a supply by friction brushes or a permanently secured flexible cable is that the machine can leave the arm to which it is connected. The machine, which is controlled from outside the reactor via its cable, runs on rails borne by the arms; the combination of the movements which the machine can make with the rotations of its bearing arm enables the machine to serve all the channels. Advantageously, the machine 44 has a television camera 57 (FIG. 1) which covers a particular channel being treated during reloading operations.

Figure 2:
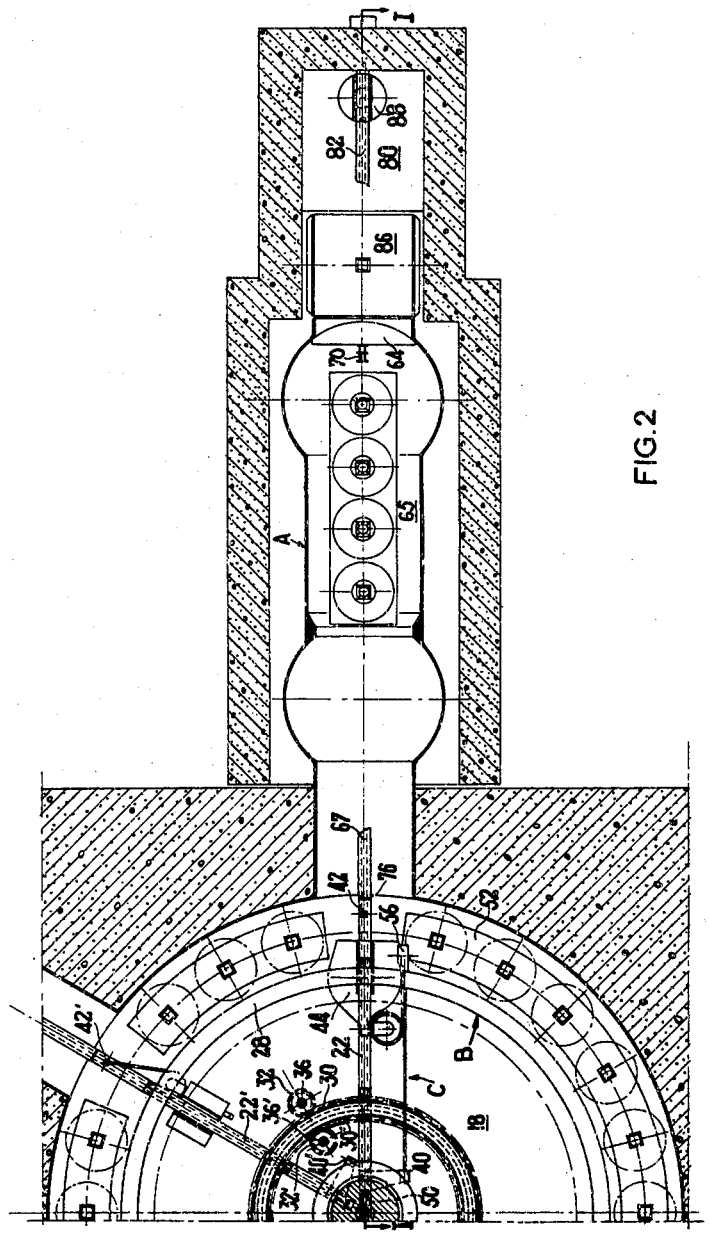
FIGURE 2 is a view of the loading and unloading arrangement in horizontal section along the line II—II of FIG. 1.

The introducing and removal system A comprises at least one tunnel and elevator system extending through the reactor vessel and preferably two identical such systems to allow for emergency repair; each system is shown in FIG. 2 as being associated with one of the arms 22, 22' but this arrangement is shown only to show how devices pass from an arm to a tunnel and vice versa and is not limitative. Each system comprises a tunnel 58 or 58'. FIGS. 1 and 2 show the tunnel 58 associated with a lock through which magazine 54 can be introduced into the attic from an elevator 60 or removed from the attic 18 to the elevator 60 without the elevator cage (which is usually at atmospheric pressure) entering into direct communication with the servicing chamber. The lock comprises two gates or hatches or the like 62, 64 capable of sealing a tunnel passage 65. In the embodiment illustrated, the gates 62, 64 are part-spherical swing doors or the like, but other arrangements are of course possible. The door 62 is shown open in FIG. 1. When the door 62 is open, a rail 66 thereon is in alignment with two stationary longitudinal rails 67, 68 on the top walls of the tunnel 58 and the passage 65. When the arm 22 comes opposite the rail (registration between the rail 66 and the arm 22 being checked by means of an optical device 69), a continuous running track extending from the central arm 50 as far as the lock bounded by the two doors is formed by the rail of the arm 22, the stationary rail 67, the moving rail 66 and the stationary rail 68. Door 64 also has a rail length 70 which, when the door 64 is open, comes opposite the rail 68 and a stationary rail 72 which extends into the elevator cage. The rail ends have mechanical stops 74, 76, 78 to limit the various travels possible along the rail; the stops are respectively retracted by the central arm 50 coming opposite the main arm 22, by the arm 22 coming opposite the rail 67, and by closure of the door 64.

At the end of the tunnel beyond the elevator cage is a chamber or recess or the like 80 having a rail 82 opposite the rail 72. Continuity between the rails 72 and 82 is provided by either of rails 84, 85 borne by a twin container 86 of the elevator when such container is in its top position (visible in FIG. 1) or in a position offset from its top position by the height of one compartment of the container 86. The container is operated from outside the reactor enclosure by a winch 87. A transfer machine 88 is a handling device similar to the machine 44 but without its channel treatment equipment, runs on the rails 82, 84, 68. Introduction of the magazines 54 into the reactor chamber from the elevator and their removal is performed in two stages, one stage of which is performed by the handling device 44 (between the storage area B and the lock) and the other by the transfer machine 88 (between the lock and the elevator container 86, such lock and such container advantageously having the same capacity). The device 88 is controlled similarly to the device 44.

Disposed in the tunnel is a conventional conveying chain 90 which can be endless or (in the embodiment illustrated) which can operate in compression and which is used for removing broken apparatus. The chain 90, which is driven from outside the reactor by a winch 92, has a retractable device for engaging and moving a remote manipulator 94 for removal of a faulty machine 44, as will be seen hereinafter.

*Normal operation*

A description of in-load refueling will now be given, with reference inter alia to the various elements forming FIG. 3 and which diagrammatically illustrate the consecutive stages of introducing a magazine of new elements into the servicing chamber 18 and how the complete device operates for unloading operation. The arrows in the various drawings show the direction in which the various items move.

FIG. 3a shows the double container 86 loaded with four magazines which have been fitted with new elements and which have been brought opposite the tunnel entry. Also visible are the transfer machine 88 in its recess or chamber, the closed door 62, and the open door 64 clearing the stop 78. The transfer machine takes each magazine seriatim and places it in passage 65 between doors 62 and 64. FIG. 3b is a view of the transfer device placing the fourth magazine 54 in the lock, while FIG. 3c shows the transfer device after its return into its chamber or recess 80, while the device 44 moves towards the door 62 first on the arm 22, then along the rail 67. The door 64 then closes to terminate the first part of the introduction.

The introduction is completed by means of the machine 44 which is moved by its own means as far as the lock entry whereafter, once the door 62 is open, the machine 44 moves into the passage 65 (FIG. 3d) and, still continuing to be operated from outside the reactor via its power supply cable, picks up a first loading can 54. The device 44 returns to the reactor chamber 18 along the rail of the arm 22, such rail is moved into a different angular position opposite a free storage station, and the machine 44 places the magazine on the storage area 52, for instance, at the opposite end of the tunnel, as can be seen in FIG. 3e. The last magazine taken up by the device 44 can be guided directly towards a channel to be treated (FIG. 3e). The passage 65 is then loaded with magazines containing used elements by the machine 44 in preparation for a removal operation, and the door 62 recloses (FIG. 3f).

The channels can be treated by machine 44 in accordance with a programme similar to the programme described in the above mentioned application. Operations are supervised by means of the television camera 57 which is set permanently to view the treated channel.

Of course, once activity drops sufficiently, magazines having used cartridges are removed by a converse series of operations to the series just described. As already seen, four magazines of irradiated but cooled elements are transferred consecutively from the peripheral storage area 52 to the inside of the passage 65. To this end, the main arm is aligned with the storage station occupied by the magazine to be removed, the machine 44 picks up such magazine, the arm 22 is moved into alignment with the tunnel, the door 62 is opened, and the machine 44 enters the passage 65 and places the magazine therein then returns on the arm 22. This operation is repeated three more times. Having placed the last magazine, the device 44 returns to the attic and the door 62 closes. The sealing door 64 opens to give access to the transfer machine 88 which moves the irradiated fuel element magazines and discharges them via the elevator and replaces them by magazines of fresh fuel elements; the machine 88 then returns to its chamber 80, whereafter the door 64 recloses.

*Removal operations*

A great advantage of the device according to the invention is that, in the event of any kind of failure or breakdown, either the irradiated fuel elements or, more generally, all the active materials located in the servicing chamber can be removed or such items can be reintroduced into the channels before closure thereof.

The degree of simplicity of machine removal depends upon the nature of the fault, and there are two very serious possibilities. The first, the loading machine 44 fails on its arm 22 without immobilizing the same. To clear this fault, the arm 22 can be brought opposite a tunnel and a remotely controlled fault-finding manipulator 94 can be moved up directly from the tunnel. The second serious possibility is that the device 44 may immobilise, for instance, the arm 22, as may occur if a fuel element jams in a channel during unloading. In this event, the remotely controlled manipulator must be brought up from a tunnel by the other main arm 22' and the central arm 50.

FIG. 4 shows the successive operations which are required in the event of a handling device 44 failing to move along its arm 22. The manipulator 94 is brought from the elevator 60 to the rail 67 from the servicing chamber to the tunnel entry. This introduction comprises as a first stage the remotely controlled manipulator being brought by the container 86 to engage with rail 68 (FIG. 4a), whereafter the door 64 is opened and the remote-controlled manipulator 94 is introduced into the passage 65 by means of the transfer device 88 which has a retractable load-gripping device. The manipulator 94, which therefore moves from rail 85 to rail 68, is disconnected during these various operations.

Once the manipulator 94 has been introduced into the passage 65, the device 88 returns to its chamber 80 (FIG. 4b) whereafter the door 64 recloses, door 62 opens and the chain 90 operates to bring the device 94 on to the rail 67 (FIG. 4c). Thereafter or simultaneously, the main arm 22 which can originally be in any position (FIG. 4d) is brought opposite the tunnel 65. The chain 90 thrusts the device 94 to the terminal part of arm 22 where the device 94 is connected up to an external power supply plug 42 by means of the remotely-controlled device 48. The device 94, which is now self-operating and which has a retractable load-gripping device, picks up the device 44 and moves the same as far as stop 74. The remotely controlled device 46 disconnects the device 44 from its power supply plug 40, whereafter the device 44 is operated with its cable completely wound. The device 94 returns to the end of arm 22 still opposite the tunnel (FIG. 4e). The device 94 is then disconnected by means of the remotely controlled device 48 and is returned by the chain 90 which brings the devices 94, 44 into passage 65 (FIG. 4f). Door 62 then closes and door 64 opens for the device 88 to pick up the other devices and bring them to the elevator (FIG. 4g). The chamber 80 is long enough to receive the transfer device followed by the remote handling device 94, the faulty handling machine 44 staying in the bottom cage of the container 86. The handling machine 44 is then released by means of a remote control system 96 (FIG. 1) which retracts the load-gripping device of the remotely controlled manipulator 94. A similar operation is performed for the manipulator 94 which the transfer device places on the rail 85 in the top cage of the container which has been brought to the level of the chamber 80 (FIG. 4h), whereafter the devices are removed by the elevator.

Upon the completion of removal of the faulty machine 44, another machine must be introduced on to the arm 22 by means of the manipulator 94. This step, in which the sequence of operations is the converse of what has just been described, is diagrammatically illustrated in FIGS. 4i to 4n. The elevator container has, in its two vertically adjacent compartments, the fresh machine 44 and the manipulator 94, and the door 64 is open (FIG. 4i). The transfer device 88 leaves its chamber and pushes the new device 44 from rail 85 on to rail 68 (FIG. 4j). Device 88 returns to its compartment, container 86 rises by the height of one compartment, and device 88 pushes manipulator 94 into the lock passage 65. The transfer device returns to its chamber 80 again, door 64 closes, and door 62 opens. Chain 90 picks up device 94 (FIG. 4k) which moves the handling device 44 (without being rigidly connected thereto) as far as rail 67 and then to rail 22. Once thereon the remote-handling device 94 is connected up by the device 48 to the plug 42 to become self-contained, whereafter the device 94 leaves the chain 90, thrusts the handling device 44 as far as abutment 74, for connection of device 44 to plug 40 by means of the remotely controlled device 46, and then returns to rail 67 (FIG. 4l) to be picked up after having been disconnected, by chain 90. The same returns the device 94 into lock passage 65 and leaves it there. Gate 62 recloses and gate 64 opens in order that transfer device 88 may pick up device 94 (FIG. 4m). Transfer device 88 returns manipulator 94 on its rail 84 into container 86 and leaves it there (FIG. 4n) for removal.

Figure 5A:
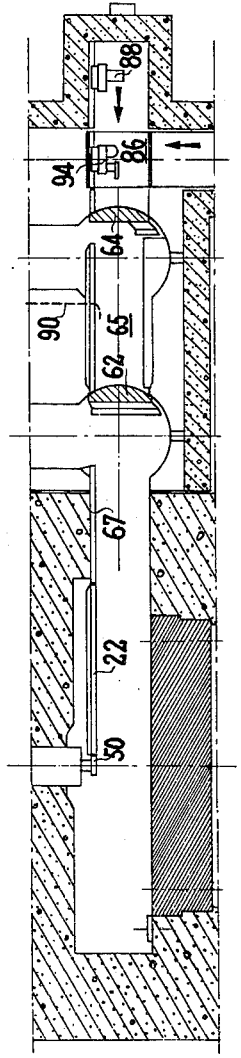
Figure 5D:
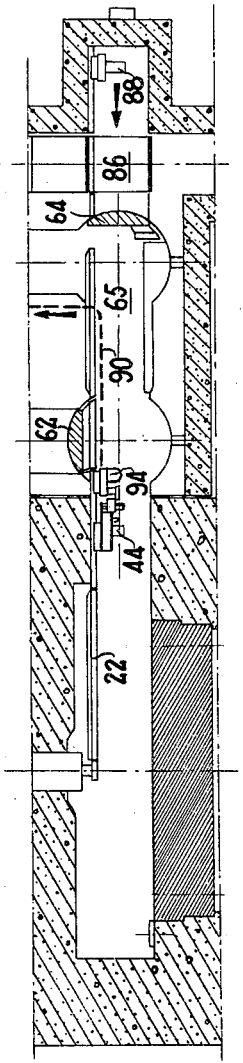
Figure 5E:
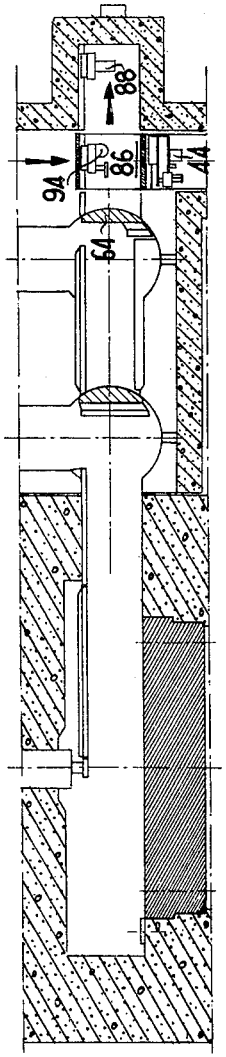

The various items which form FIG. 5 show the sequence of machine removal operations required if the loading machine immobilises the loading arm 22', for instance, because of a fuel element jamming. If this occurs, the central arm 50 is disconnected from the arm 22' and aligned with the arm 22 by means of the periscope on the central arm, whereafter the arms 50, 22 are rigidly connected to one another, whereafter the arm 22 is moved opposite the rail 67. The remote-controlled manipulator 94 is brought into one of the elevator container compartments, the two doors being closed and the transfer device 88 being retracted in its compartment, as FIG. 5a shows. The manipulator 94 is then moved on to arm 22 and connected to its power supply plug by a sequence of operations identical to what has already beeen described. The arm 22, which is initially disposed opposite the rail 67 (FIG. 5b), is brought into alignment with the arm 22' and the handling device 94 passes from arm 22 to the other arm 22' (the central periscope being retracted) and approaches the device 44. Through an aperture in the loading passage of the element magazine, the manipulator 94 disconnects the cable of the machine gripper to release the machine. The manipulator 94 then plugs the corresponding channel and pulls the failed machine 44 on to the arm 22 (FIG. 5c) after the faulty machine has been disconnected by means of the system 46. The arm 22 is returned in front of the tunnel, and the group formed by the failed device 44 and the remote-handling device 94 is removed as hereinbefore described, first towards the lock on the chain 90 (FIG. 5d), then to the elevator. The transfer device 88 first places the failed device 44 in the bottom compartment of the container, then places the remote-controlled manipulator 94 in the top compartment of the container. Door 64 then recloses (FIG. 5e) and the failed machine 44 and the remotely controlled manipulator 94 are removed.

A new handling machine 44 is introduced just as hereinbefore described, the arm 22' now being released. As will be apparent from the description, all the operations can be controlled and supervised either through the agency of optical devices in the central protection dome (periscope) and at the periphery of the servicing chamber ceiling at the level of the locks, or by means of television cameras on the transfer device, the unloading device, and, possibly, the handling machine 44.

Of course, the embodiment just described is not exclusive. Inter alia, the introduction system A can be used in association with a storage device which is of the kind disclosed in the parent application and which does not have a fixed station. Of course, this invention covers variants of all or some of the features hereinbefore described which are in the nature of mechanical equivalents, however they may be used.

We claim:

1. In a gas-cooled nuclear reactor having a moderator core formed with parallel spaced fuel element channels, a pressure vessel and a biological protection shield surrounding the core, a servicing chamber inside the pressure vessel and biological shield, a lock between said servicing chamber and the atmosphere and means for the transfer of fuel elements between said chamber and said channels comprising an intermediate fuel element storage means within said pressure vessel and biological shield, means for conveying fuel elements between said lock and the atmosphere, an arm rotable in said servicing chamber about a vertical axis, a fuel element handling machine movable along said arm, means for positioning said arm and said machine in servicing relation to a selected channel for insertion and withdrawal of fuel elements into and out of said channel and for positioning said arm and machine in servicing relation to said fuel element storage means and for movement of said machine between said arm and said lock for conveying fuel elements between said machine and said lock.

2. A reactor as described in claim 1 including an elevator adjacent said lock and leading to the atmosphere for moving the fuel elements to position adjacent said conveying means.

3. A reactor as described in claim 1, said arm comprising at least two main arms, a central arm and releasable arm-aligning means for aligning said central arm with each of said two main arms whereby said handling machine may move from one of said main arms to another of said main arms.

4. A reactor as described in claim 3 including registrable guide means on said main arms and in said lock for movement of said handling machine between each of said main arms and said lock.

5. A reactor as described in claim 3 including a power supply, a control cable and a winding drum for said handling machine, an electrical supply plug for said arm and means for connecting said cable to said plug from outside the reactor.

6. A reactor as described in claim 1 including a driving chain in said lock controlled from outside the reactor and a manipulator moved by said chain between said lock and said arm when said arm is opposite said lock.

7. A reactor as described in claim 6 including an electrical supply plug on said arm and means for connecting said manipulator to said plug from outside the reactor.

References Cited by the Examiner
UNITED STATES PATENTS
3,066,089   11/62   Davies _____ 176—30

FOREIGN PATENTS
1,230,954   4/60   France.

CARL D. QUARFORTH, *Primary Examiner.*
REUBEN EPSTEIN, *Examiner.*